United States Patent
Futamoto et al.

(10) Patent No.: US 6,544,672 B1
(45) Date of Patent: *Apr. 8, 2003

(54) MAGNETIC RECORDING MEDIUM AND MAGNETIC STORAGE

(75) Inventors: Masaaki Futamoto, Tsukui-gun (JP); Nobuyuki Inaba, Hasuda (JP); Tomoo Yamamoto, Hachiouji (JP); Masukazu Igarashi, Kawagoe (JP); Yuzuru Hosoe, Hino (JP); Akira Ishikawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/678,382

(22) Filed: Oct. 3, 2000

Related U.S. Application Data

(63) Continuation of application No. 08/555,415, filed on Nov. 9, 1995, now Pat. No. 6,251,532.

(30) Foreign Application Priority Data

Nov. 11, 1994 (JP) .............................. 6-277776

(51) Int. Cl.$^7$ ............................. G11B 5/66; G11B 5/70
(52) U.S. Cl. ....................... 428/694 TM; 428/694 TP; 428/900
(58) Field of Search ................. 428/694 TP, 694 TS, 428/694 TM, 900

(56) References Cited

U.S. PATENT DOCUMENTS

| | | | |
|---|---|---|---|
| 4,746,569 A | 5/1988 | Takahashi | 428/323 |
| 4,749,628 A * | 6/1988 | Ahlert et al. | 428/660 |
| 5,147,732 A | 9/1992 | Shiroishi | 428/668 |
| 5,326,637 A * | 7/1994 | Nasu et al. | 428/336 |
| 5,492,774 A | 2/1996 | Tateno | 428/694 R |
| 5,567,523 A * | 10/1996 | Rosenblum et al. | 428/408 |
| 5,597,638 A | 1/1997 | Saito | 428/141 |
| 5,736,235 A * | 4/1998 | Matsuda et al. | 428/212 |
| 5,815,343 A | 9/1998 | Ishikawa | 360/97.01 |
| 5,851,643 A | 12/1998 | Honda | 428/212 |
| 6,251,532 B1 * | 6/2001 | Futamoto et al. | 428/694 T |

FOREIGN PATENT DOCUMENTS

| | | |
|---|---|---|
| JP | 60-076015 | 4/1985 |
| JP | 60-193124 | 10/1985 |
| JP | 63-302417 | 12/1988 |
| JP | 2-168418 | 6/1990 |
| JP | 03-058316 | 3/1991 |
| JP | 4-248115 | 9/1992 |
| JP | 6-162472 | 6/1994 |

OTHER PUBLICATIONS

Matsushita et al., "Preparation of Co Ferrite Thin Films with Large Perpendicular and In–plane Coercivities by Facing Targets Sputtering", Sep. 1992, IEEE Trans. Magn., vol. 28, No. 5, pp. 3108–3110.*

(List continued on next page.)

*Primary Examiner*—Holly C. Rickman
(74) *Attorney, Agent, or Firm*—Antonelli, Terry, Stout & Kraus, LLP

(57) ABSTRACT

Disclosed is a magnetic recording medium capable of reducing noise and an error rate of the medium. The medium comprises a nonmagnetic substrate; a magnetic layer formed on the surface of the nonmagnetic substrate directly or through a nonmagnetic underlayer; and a protective layer formed on the magnetic layer; wherein the magnetic recording medium satisfies the following relationships:

$$-0.5 \leq \{Hc(1)-Hc(p)\}/Hc(1) \leq 0.3$$

$$Hc(1) \geq 2 \text{ kOe}$$

$$20 \text{ Gx}\mu m \leq Br(1) \times t \leq 100 \text{ Gx}\mu m$$

where $Hc(1)$ indicates a corecivity of the magnetic layer measured in the longitudinal direction; $Hc(p)$ indicates a coercivity of the magnetic layer measured in the perpendicular direction; $Br(1)$ indicates a remanent magnetization of the magnetic layer measured in the longitudinal direction; and "t" indicates a layer thickness of the magnetic layer.

3 Claims, 3 Drawing Sheets

OTHER PUBLICATIONS

H. Neal Bertram, "Theory of Magnetic Recording" Cambridge University Press, 1994.

EMT Velu and DN Lambeth, J. Appl. Physics 69(8), (1991) pp 5175–5177, "CoSm–based High–Coercivity thin films for longitudinal recording".

EMT Velu and DN Lambeth, IEEE Transactions on Magnetics, vol. 28, No. 5,(1992) pp3249–3254: "High Dencity Recording on SmCo/Cr Thin Film Media".

C. Denis Mee and Eric D. Daniel, "Magnetic Recording Technology" Second Edition, McGraw–Hill, 1995.

* cited by examiner

MAGNETIC RECORDING MEDIUM AND MAGNETIC STORAGE

This application is a continuation of prior application Ser. No. 08/555,415, filed Nov. 9, 1995, now U.S. Pat. No. 6,251,532.

BACKGROUND OF THE INVENTION

The present invention relates to a magnetic recording medium, and particularly to a magnetic recording medium improved to be suitable for high density magnetic recording by reducing noise generated from the magnetic recording medium and to a magnetic storage device using the same.

Studies have been made on a magnetic recording medium formed of a continuous magnetic thin film for realizing high density magnetic recording. Specifically, such a magnetic recording medium is prepared by a method wherein a thin film made of a ferromagnetic metal, Co or Co-based alloy is formed on a substrate made of a nonmagnetic material such as aluminum or glass coated with a plastic film or NiP film by radio frequency sputtering, ion beam sputtering, vacuum evaporation, electric plating or chemical plating. In the magnetic recording medium thus prepared, a microstructure of a magnetic thin film is closely related to magnetic properties. As a result, various attempts have been made to improve a magnetic layer constituting a magnetic recording medium for enhancing magnetic recording density and reproduced output.

For a longitudinal magnetic recording medium, it has been conceived that an easy magnetization axis thereof is desirable to be parallel to a substrate. On the other hand, various methods have been known to provide an underlayer between a substrate and a magnetic layer for ensuring longitudinal magnetic anisotropy. For example, U.S. Pat. No. 4,654,276 discloses a method in which a layer made of W, Mo, Nb or V is used as an underlayer for a Co—Pt magnetic layer. U.S. Pat. No. 4,652,499 discloses a method in which a V—Cr or Fe—Cr alloy material is used as an underlayer. Japanese Patent Laid-open No. Sho 63-106917 discloses a method in which a nonmagnetic layer made of Cr, Ho, Ti or Ta as an underlayer for a magnetic layer made of Co, Ni, Cr or Pt. U.S. Pat. No. 4,789,598 discloses a method in which Cr or a Cr—V alloy is effective as an underlayer for a Co—Pt—Cr layer.

When a Co-based alloy magnetic layer is formed on a substrate through an underlayer made of Cr or a Cr alloy by sputtering, the underlayer is first oriented in (100) or (110). In this case, when the Co-based alloy magnetic layer is formed on the (100) orientated layer, the easy magnetization axis thereof is parallel to the substrate; while when the Co-based alloy magnetic layer is formed on the (110) oriented layer, the easy magnetization axis thereof is substantially in parallel to the substrate, more specifically, it is inclined at about 30° relative to the surface of the substrate.

For improvement in an areal density of magnetic recording, it is required to reduce noise generated from a magnetic recording medium as well as to enhance resolution of magnetic recording. In particular, when a reproducing magnetic head of a magneto-resistance (MR) type being high in read-out sensitivity, it becomes important to reduce noise of a magnetic recording medium. The prior art magnetic recording medium of a type in which the easy magnetization axis thereof is oriented in the longitudinal direction has a disadvantage that it can improve resolution of magnetic recording; however, it has a difficulty in reducing noise thereof. In particular, for an areal recording density of magnetic recording increased to 1 Gb/in² or more, the prior art magnetic recording medium is very difficult to reduce noise thereof.

SUMMARY OF THE INVENTION

An object of the present invention is to provide a magnetic recording medium suitable for high density magnetic recording and a magnetic storage device using the same.

The present inventors have experimentally studied magnetic recording media suitable for high density magnetic recording and found that the above-described object can be achieved by the following methods.

Specifically, it was revealed that a magnetic recording medium being low in degree of orientation or being isotropic (containing a perpendicular magnetization component) is superior in noise reduction to a magnetic recording medium with the easy magnetization axis thereof oriented in the longitudinal direction. Such a magnetic recording medium is required to satisfy the following requirement:

$$-0.5 \leq \{Hc(1)-Hc(P)\}/Hc(1) \leq 0.3$$

where $Hc(1)$ is a coercivity measured in the longitudinal direction, and $Hc(p)$ is a coercivity measured in the perpendicular direction.

In this requirement, to realize high density magnetic recording having an areal recording density of 1 Gb/in² or more, the corecivity $Hc(1)$ is required to be 2 kOe or more and a product of a remanent magnetization Br and a layer thickness "t" is required to be within the range of from 20 to 100 G×μm. When $Hc(1)$ is less than 2 kOe or Br×t is more than 100 G×μm, resolution of magnetic recording fails to be enhanced. On the other hand, when Br×t is less than 20 G×μm, a sufficient signal output cannot be obtained upon reproduction of a recording signal by the magnetic head, the magnetic recording medium is difficult to be operated as a magnetic storage device.

To obtain a magnetic recording medium capable of satisfying the above-described requirement, the magnetic recording medium is required to ensure a high coercivity $Hc(1)$ while thinning the thickness of a magnetic layer to 20 nm or less. In general, for a magnetic layer having a thickness of 20 nm or less, it is difficult to ensure a high coercivity. Consequently, to ensure a high coercivity of a magnetic recording medium using a magnetic layer having a thickness of 20 nm or less, a magnetic anisotropy energy Ku of the magnetic layer is required to be $3 \times 10^6$ erg/cm³ or more.

To obtain a high coercivity $Hc(1)$ in a magnetic recording medium using a magnetic layer being thin in thickness, it is effective that the magnetic layer is of a laminated structure. Specifically, in the case where the thickness of a magnetic layer is limited for reducing the value of Br×t to 100 G×μm or less, the coercivity $Hc(1)$ can be increased using the magnetic layer of a laminated structure in which two kinds or more magnetic layers different in composition are directly laminated, as compared with a single magnetic layer. While being not clear, the reason for this is conceived that stress and strain are generated at each interface between the magnetic layers because of a slight difference in lattice constant therebetween, thus contributing to improvement in corecivity. In this case, nonmagnetic elements of alloy components constituting the magnetic layers are collected at the interface between the magnetic layers. As a result, magnetic coupling between a plurality of the magnetic layers is weakened, causing an effect in reducing noise generated from the magnetic recording medium.

To positively weaken magnetic coupling between a plurality of magnetic layers, it is effective to insert a nonmagnetic layer at each interface between two kinds or more of the magnetic layers different in composition.

Another method may be also adopted to form a nonmagnetic material between crystal grains of a magnetic thin layer, wherein a magnetic layer is formed by sputtering, using an alloy target made of a Co—Cr, Co—Pt, Co—Cr—Ta, or Co—Cr—Pt alloy placed with pellets of a nonmagnetic material such as $SiO_2$, $ZrO_2$, $TiB_2$, $ZrB_2$, $MoSi_2$, $LaB_6$, SiC, $B_4C$, or $B_6Si$. In this method, an average grain diameter of magnetic crystals constituting the magnetic thin layer becomes smaller and also a thin layer made of nonmagnetic material is interposed between the crystal grains of the magnetic thin layer. In the magnetic recording medium having such a structure, the magnetic coupling force between magnetic crystal grains can be reduced, and thereby noise of the medium can be reduced. To realize a high density magnetic recording having an areal recording density of 1 $Gb/in^2$ or more, the average grain diameter of magnetic crystals of a magnetic layer is desirable to be within the range of from 5 to 15 nm.

As a magnetic head in combination with such a magnetic recording medium, a composite head of a thin film ring head for recording and a magneto-resistance effect (MR) head being high in reproduction sensitivity for reproduction is desirable. To realize a high density magnetic recording having an areal recording density of 1 $Gb/in^2$ or more, a linear recording density of 100 kFCI or more is generally required, and in this case, a distance between the magnetic head and the surface of a magnetic film of a magnetic recording medium is required to be 0.08 μm or less. The smaller the distance, the better the high density recording. However, when the distance is 0.02 μm or less, the thickness of a protective layer and a lubricant layer provided on the surface of the magnetic layer becomes significantly thin. This is poor in usability in terms of tribological reliability.

To realize a high density magnetic recording having an areal recording density of 1 $Gb/in^2$ or more, the track width of a magnetic head is also required to be made smaller. For a linear recording density of 100 kFCI, the track density must be 10 kTPI or more for ensuring the areal recording density of 1 $Gb/in^2$ or more. In this case, the track pitch becomes about 2.5 μm or less. When a guard band of 0.5 μm is set between recording tracks, the track width of a magnetic head must be 2 μm or less. On the other hand, a magnetic head having a track width being 0.3 μm or less is difficult to be practically prepared. The track width of a magnetic head in combination with the magnetic recording medium is thus within the range of from 0.3 to 2.0 μm. To realize an areal density of 4 $Gb/in^2$ or more, a giant magneto-resistance effect (G-MR) head being higher in sensitivity than the MR head is desirable to be used as the reproducing head.

According to the present invention, there can be provided a magnetic recording medium suitable for high density magnetic recording by reducing noise generated therefrom and suppressing an error rate thereof, and thereby a magnetic storage device having an areal recording density of 1 $Gb/in^2$ or more can be realized.

DETAILED DESCRIPTION OF THE PREFERRED EMBODIMENTS

Hereinafter, preferred embodiments of the present invention will be described in detail with reference to accompanying drawings.

Embodiment 1

Figure 1:
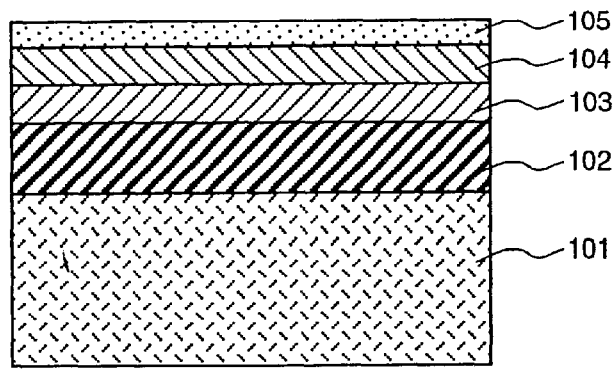
FIG. 1 is a sectional view of a first embodiment of a magnetic recording medium of the present invention.

A magnetic recording medium having a structure shown in FIG. 1 was prepared using a glass substrate (diameter: 2.5 in.) in the following procedure.

A Cr layer 102 having a body centered cubic (bbc) structure was formed on a substrate 101 at a substrate temperature of 300° C. to a thickness of 100 μm by radio DC magnetron sputtering. In this layer formation, a pressure of Ar gas used for sputtering was changed within the range of from 10 to 50 mTorr. A Co-10at%Cr-8at%Pt layer 103 having a hexagonal close-packed (hcp) structure was formed on the Cr layer to a thickness of 7 nm, and subsequently a Co-5at %Cr-21at %Pt layer 104 was formed to a thickness of 10 nm.

The above layers were measured in terms of magnetic anisotropy energy using a magnetic torque meter. As a result, the magnetic anisotropy energy Ku of the Co-10at%Cr-8at%Pt layer 103 was $3.6 \times 10^6$ $erg/cm^3$, and the Ku of the Co-5 at%Cr-21at%Pt layer 104 was $4.3 \times 10^6$ $erg/cm^3$. The pressure of Ar gas upon formation of the magnetic layers was specified at 5 mTorr. A carbon layer serving as a protective layer 105 was formed on these magnetic layers to a thickness of 10 nm, and a lubricant layer was then formed to a thickness of 5 nm. A magnetic recording medium was thus prepared.

Figure 2:
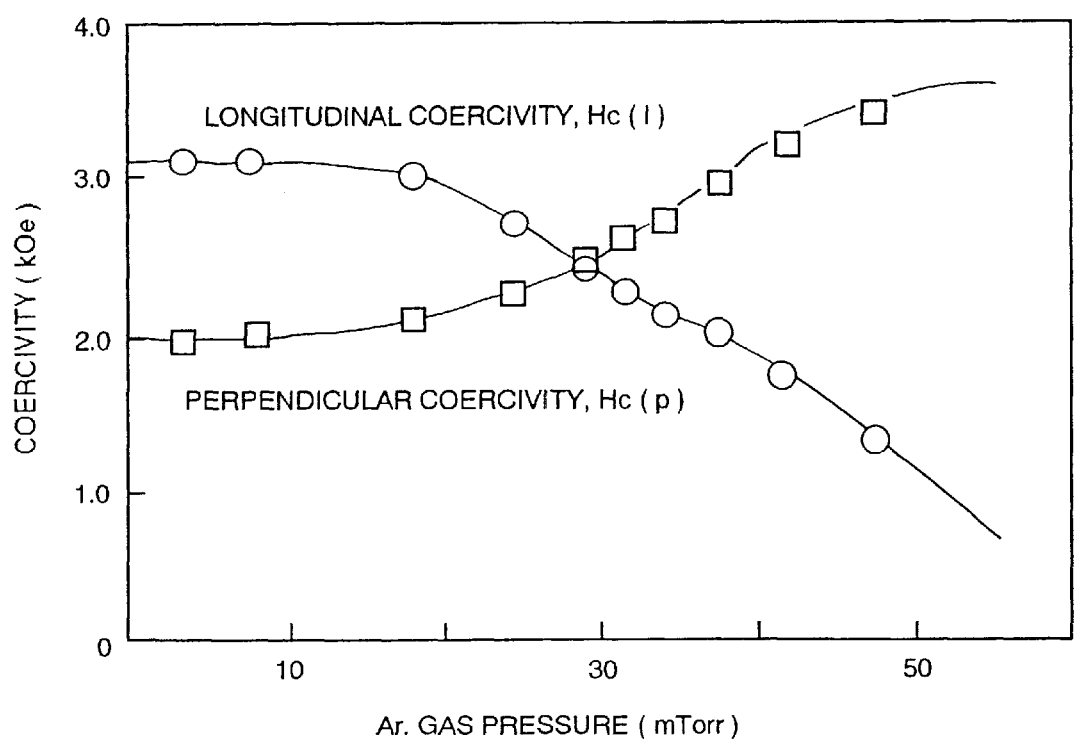
FIG. 2 is a graph showing the relationship between a condition for forming the magnetic recording medium shown in FIG. 1 and a coercivity of the medium.

FIG. 2 is a graph showing the dependence of an Ar gas pressure on Hc(1) and Hc(p) of a magnetic recording medium prepared with an Ar gas pressure varied upon formation of a Cr layer. The Hc(1) and Hc(P) were measured using a vibrating sample magnetometer (VSM). For the Ar gas pressure of 28 mTorr or less, the relationship of Hc(1) ≧Hc(p) was given. On the other hand, for the Ar gas pressure of 28 mTorr or more, the relationship of [Hc(1) ≦Hc(p)] was given.

Each layer structure was then examined by X-ray diffraction. As a result, the Cr layer exhibited (110) preferred orientation. On the other hand, in the Co—Cr—Pt magnetic layer growing on the Cr layer, the easy magnetization axis thereof was oriented in the direction inclined by about 30° relative to the surface of the substrate when the Ar gas pressure was low; while the ratio of crystal grains having the easy magnetization axis oriented in the perpendicular direction was increased when the Ar gas pressure became higher. The microstructure of the magnetic layer was also examined by electron microscope. This showed that when the Ar gas pressure was more than 20 mTorr, gaps of 1 nm or more were present between magnetic crystal grains.

The value of Br×t of the magnetic recording medium was 75±10 Gx μm. Magnetic recording/reproducing properties of the magnetic recording medium were then measured using a recording/reproducing separate type magnetic head. In this case, a distance between the magnetic head and the magnetic recording medium was set at 0.04 μm. The measured results are shown in Table 1.

(thickness: 4.5 nm), and a carbon layer 306 (thickness: 5 nm). A magnetic recording medium was thus prepared.

Each layer structure of this magnetic recording medium was examined. As a result, it was revealed that an average

TABLE 1

| sample | a | b | c | d | e | f | g | h |
|---|---|---|---|---|---|---|---|---|
| Hc(1) kOe | 3.2 | 3.0 | 2.7 | 2.5 | 2.3 | 2.1 | 2.0 | 1.8 |
| Hc(p) kOe | 2.0 | 2.1 | 2.2 | 2.5 | 2.7 | 2.8 | 3.0 | 3.2 |
| Hc(1)-Hc(p)/Hc(1) | 0.38 | 0.30 | 0.19 | 0 | −0.18 | −0.33 | −0.5 | −0.78 |
| resolution $D_{50}$ kFCI | 145 | 142 | 140 | 138 | 130 | 128 | 125 | 110 |
| medium noise (relative value) | 1.0 | 0.8 | 0.6 | 0.4 | 0.35 | 0.30 | 0.26 | 0.20 |
| error rate | $1 \times 10^{-5}$ | $1 \times 10^{-6}$ | $7 \times 10^{-7}$ | $7 \times 10^{-7}$ | $8 \times 10^{-7}$ | $8 \times 10^{-7}$ | $1 \times 10^{-6}$ | $5 \times 10^{-5}$ |

From Table 1, it becomes apparent that as the value of {Hc(1)–Hc(p)}/Hc(1) is decreased, resolution of the recording is reduced and noise of the medium is also largely reduced. The magnetic recording/reproducing system was evaluated in terms of error rate at an areal recording density equivalent to 2 Gb/in². As a result, a desirable error rate in the range of $1 \times 10^{-6}$ or less was obtained when the value of {Hc(1)–Hc(p)}/Hc(1) was within the range of from −0.5 to 0.3.

Embodiment 2

Figure 3:
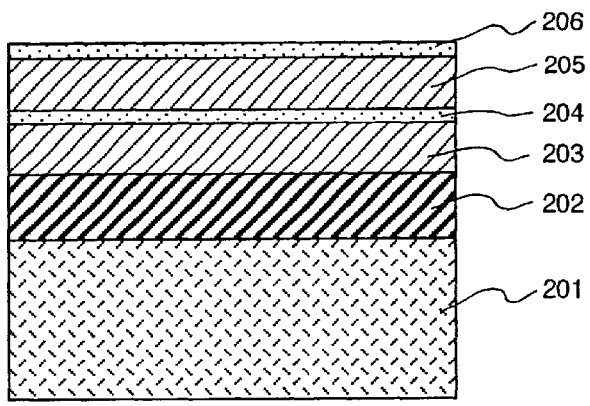
FIG. 3 is a sectional view of a second embodiment of the magnetic recording medium of the present invention.

A magnetic recording medium having a structure shown in FIG. 3 was prepared using a glass substrate (diameter: 2.5 in.) in the following procedure.

A Cr-10at%Ti layer 202 having a bcc structure was formed on a substrate 201 to a thickness of 10 nm at a substrate temperature of 350° C. by radio frequency DC magnetron sputtering. In this layer formation, an Ar gas pressure was specified at 30 mTorr. On the Cr-10 at%Ti layer 202, there were continuously formed layers: a Co-17at%Cr-10 at%Pt-3at%Ta layer 203 having a hcp structure (thickness: 7.5 nm), a Cr-10 at%Ti nonmagnetic layer 204 (thickness: 1 nm), a Co-17at%Cr-10 at%Pt-3at%Ta layer 205 (thickness: 7.5 nm), and a carbon layer 206 (thickness: 5 nm). A magnetic recording medium was thus prepared.

In this magnetic recording medium, the magnetic anisotropy energy Ku was $4 \times 10^6$ erg/cm³, Hc(1) was 2.7 kOe, Hc(p) was 2.4 kOe, and Brxt was 90 Gxμm. The microstructure of the magnetic layer in this medium was examined using electron microscope, which gave the result that an average grain diameter of magnetic crystal grains of the magnetic layer was about 12 nm.

Recording/reproducing properties of the magnetic recording medium were examined in the same condition as in Embodiment 1. This showed that a desirable error rate in the range of $1 \times 10^{-6}$ or less was obtained at an areal recording density of 2 Gb/in².

Embodiment 3

Figure 4:
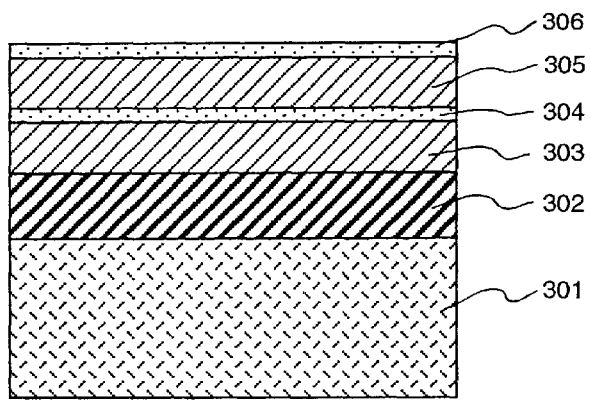
FIG. 4 is a sectional view of a third embodiment of the magnetic recording medium of the present invention.

A magnetic recording medium having a structure shown in FIG. 4 was prepared using a glass substrate (diameter: 1.8 in.) in the following procedure.

A Cr-45at%V layer 302 having a bcc crystal structure was formed on a substrate 301 to a thickness of 8 nm at a substrate temperature of 350° C. by radio frequency DC magnetron sputtering. In this layer formation, an Ar gas pressure was specified at 30 mTorr. On the Cr-45at%V layer 302, there were continuously formed layers: a Co-17at%Cr-12at%Pt layer 303 (thickness: 5.5 nm), a ZrO₂ nonmagnetic layer 304 (thickness: 1 nm), a Sm—Co alloy layer 305 crystal grain diameter of the magnetic layer was 10±3 nm, and although an epitaxial growth relationship was present between the Cr—V layer and the Co—Cr—Pt magnetic layer, any epitaxial growth relationship was not present between two kinds of the magnetic layers. In this magnetic recording medium, the magnetic anisotropy energy Ku was $4.8 \times 10^6$ erg/cm³, Hc(1) was 2.9 kOe, Hc(p) was 2.6 kOe, and Brxt was 50 Gxμm.

Recording/reproducing properties of the magnetic recording medium were examined in the same condition as in Embodiment 1. This showed that a desirable error rate in the range of $1 \times 10^{-6}$ or less was obtained at an areal recording density of 3 Gb/in².

Embodiment 4

Figure 5:
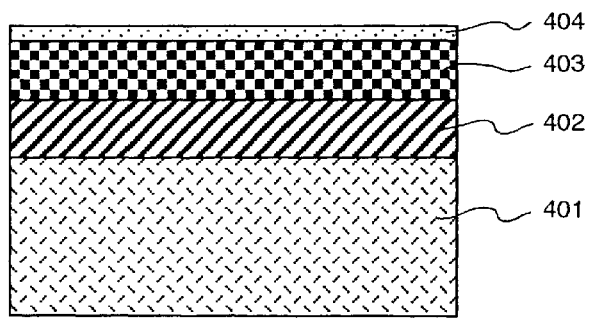
FIG. 5 is a sectional view of a fourth embodiment of the magnetic recording medium of the present invention.

A magnetic recording medium having a structure shown in FIG. 5 was prepared using a glass substrate (diameter: 1.8 in.) in the following procedure.

A Cr-5 at %Nb layer 402 having a bcc structure was formed on a substrate 401 to a thickness of 12 nm at a substrate temperature of 320° C. by radio frequency DC magnetron sputtering. In this layer formation, an Ar gas pressure was specified at 15 mTorr. A magnetic layer 403 was formed on the Cr-5at%Nb layer 402 to a thickness of 15 nm by DC magnetron sputtering. In this sputtering, there was used an alloy target made of a Co-14at%Cr-12at%Pt alloy having a hcp structure on which pellets of ZrO₂ were placed at an area ratio of 12%. Then, a carbon, layer 404 as a protective layer was continuously formed thereon to a thickness of 5 nm. A magnetic recording medium was thus prepared.

Each layer structure of this magnetic recording medium was examined. As a result, it was revealed that an average crystal grain diameter of the magnetic layer was 9±3 nm, and a nonmagnetic layer of ZrO$_x$ having a thickness of about 0.5 nm was present between magnetic crystal grains. In this magnetic recording medium, the magnetic anisotropy energy Ku was $3.2 \times 10^6$ erg/cm³, Hc(1) was 2.2 kOe, Hc(p) was 1.6 kOe, and Brxt was 58 Gxμm.

Recording/reproducing properties of the magnetic recording medium were examined in the same condition as in Embodiment 1. This showed that a desirable error rate in the range of $1 \times 10^{-6}$ or less was obtained at an areal recording density of 2 Gb/in².

Even in the case where pellets of ZrO₂ was replaced with either of pellets of SiO₂, TiB₂, ZrB₂, MoSi₂, LaB₆, SiC, B₄C, and B₆Si, magnetic crystal grains were refined and a nonmagnetic layer having a thickness of 0.3 nm or more was formed between the magnetic crystal grains.

For the magnetic recording medium satisfying the following requirements, $Ku \geq 3 \times 10^6$ erg/cm$^3$, $Hc(1) \geq 2$ kOe, $-0.5 \leq \{Hc(1)-Hc(P)\}/Hc(1) \leq 0.3$, and 20 G×$\mu$m $\leq$ Br×t $\leq$ 100 G×$\mu$m, a desirable error rate in the range of $1 \times 10^{-6}$ was obtained at an areal recording density of 2 Gb/in$^2$.

Embodiment 5

Figure 6:
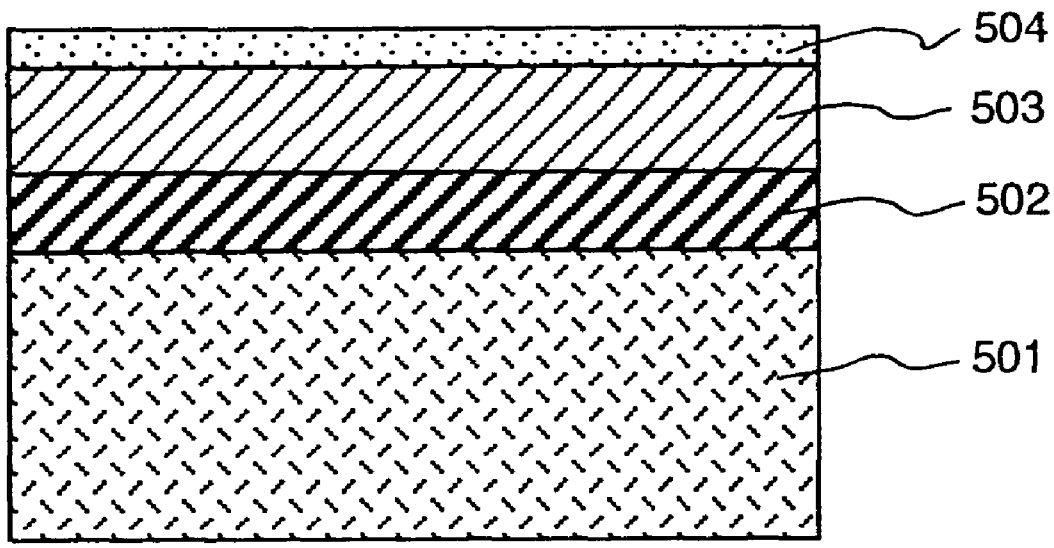
FIG. 6 is a sectional view of a fifth embodiment of the magnetic recording medium of the present invention.

A magnetic recording medium having a structure shown in FIG. 6 was prepared using a glass substrate (diameter: 1.8 in.) in the following procedure.

A Co—O nonmagnetic layer 502 having a NaCl structure was formed on a substrate 501 to a thickness of 12 nm at a substrate temperature of 100° C. by radio frequency magnetron sputtering. In this layer formation, a (Ar+O$_2$) gas pressure was specified at 15 mTorr. A magnetic layer 503 was then formed on the Co—O layer 502 to a thickness of 15 nm at a (Ar+O$_2$) gas atmosphere by DC magnetron sputtering. In this sputtering, an alloy target made of a Co—Pt alloy having a hcp structure was used. A carbon layer 504 as a protective layer was continuously formed thereon to a thickness of 3 nm. A magnetic recording medium was thus prepared.

Each layer structure of this magnetic recording medium was examined. As a result, it was revealed that an average crystal grain diameter of the magnetic layer was 6±1 nm, and in the magnetic layer, magnetic crystal grains were mixed with nonmagnetic Co—o crystal grains. In this magnetic recording medium, the magnetic anisotropy energy Ku was $3.1 \times 10^6$ erg/cm$^3$, Hc(1) was 2.8 kOe, Hc(p) was 3.1 kOe, and Br×t was 45 G×$\mu$m.

Recording/reproducing properties of the magnetic recording medium were measured by sliding a recording/reproducing separate type head relative to the magnetic recording medium in a contact condition. The separate type head is composed of a thin film ring head having a track width of 0.8 $\mu$m and a high sensitivity reproducing head using a giant magneto-resistance effect film (G-MR film). A distance between the magnetic head and the surface of the magnetic recording medium was set at 0.03 $\mu$m. As the result, it was revealed that a desirable error rate in the range of $1 \times 10^{-6}$ or less was obtained at an areal recording density of 8 Gb/in$^2$.

As described above, in the present invention, a magnetic recording medium capable of reducing noise of the medium and an error rate can be provided, and thereby, a magnetic disk device having a recording density of 1 Gb/in$^2$ or more can be realized. Therefore, it becomes possible to reduce the size of the magnetic disk device and to easily increase the capacity of the device.

What is claimed is:

1. A magnetic recording medium comprising:

a nonmagnetic substrate;

an underlayer formed on said nonmagnetic substrate;

a magnetic layer formed on said underlayer; and a protective layer formed on said magnetic layer;

wherein said magnetic recording medium satisfies the following relationships:

$-0.5 \leq \{Hc(1)-Hc(p)\}/Hc(1) \leq 0.3$ $Hc(1) \geq 2$ kOe

20 G×$\mu$m $\leq Br(1) \times t \leq$ 100 G×$\mu$m wherein Hc(1) indicates a coercivity of said magnetic layer measured in the longitudinal direction; Hc(p) indicates a coercivity of said magnetic layer measured in perpendicular direction; and said magnetic layer has a laminated structure comprising two or more magnetic layers.

2. A magnetic recording medium according to claim 1, wherein a nonmagnetic layer is interposed between said two or more magnetic layers.

3. A magnetic recording medium according to claim 1, wherein said magnetic layer consists essentially of Co alloys.

* * * * *